United States Patent [19]

Kolkmann et al.

[11] Patent Number: 4,683,127

[45] Date of Patent: Jul. 28, 1987

[54] PROCESS FOR MAKING WET-PROCESS PHOSPHORIC ACID

[75] Inventors: Friedrich Kolkmann, Brühl; Herbert Ressel, Erftstadt; Reinhard Gradl, Erftstadt; Günther Schimmel, Erftstadt, all of Fed. Rep. of Germany

[73] Assignee: Hoechst Aktiengesellschaft, Fed. Rep. of Germany

[21] Appl. No.: 826,289

[22] Filed: Feb. 5, 1986

[30] Foreign Application Priority Data

Feb. 15, 1985 [DE] Fed. Rep. of Germany ....... 3505247

[51] Int. Cl.$^4$ ............................................. C01B 25/16
[52] U.S. Cl. ................................ 423/321 R; 423/319; 423/320
[58] Field of Search ................ 423/320, 321 R, 321 S, 423/317, 319

[56] References Cited

U.S. PATENT DOCUMENTS 4,132,765  1/1979  Yates ................................ 423/321 R

FOREIGN PATENT DOCUMENTS 3328499  2/1985  Fed. Rep. of Germany ... 423/321 S
2507170 12/1982  France ............................. 423/321 R Primary Examiner—Gregory A. Heller
Attorney, Agent, or Firm—Connolly and Hutz

[57] ABSTRACT

Wet-process phosphoric acid is made by subjecting a phosphate ore to processing treatment with a mineral acid resulting in the formation of a processed suspension. The formation of silicofluorides is obviated by adding, either to the phosphate ore or the processed suspension, a quantity of an aluminum compound soluble in phosphoric acid sufficent for the processed suspension to present an aluminum concentration of 0.3 to 1.0 wgt %, based on $P_2O_5$.

5 Claims, 3 Drawing Figures

Solubility Characteristics of $Na_2SiF_6$ In Crude Phosphoric Acid (Measured as F-Content)

Solubility Characteristics of $Na_2SiF_6$ In Crude Phosphoric Acid (Measured as F-Content)

F-Content in Bu-craa Crude Acid Above $Na_2SiF_6$-Precipitate At 50°C.

PROCESS FOR MAKING WET-PROCESS PHOSPHORIC ACID

The present invention relates to a process for making wet-process phosphoric acid by subjecting a phosphate ore to processing treatment with a mineral acid with the resultant formation of a processed suspension which is subsequently separated into solid matter retained and formed, on the one hand, and into crude phosphoric acid formed, on the other.

The phosphate ore is customarily processed using sulfuric acid so that crude phosphoric acid is obtained together with calcium sulfate semihydrate or dihydrate, depending on the reaction conditions selected. The calcium sulfate compound is normally separated by filtration with the acid of a vacuum filter; next, the filtered material is commonly subjected to multistage countercurrent scrubbing in order to recover the phosphoric acid as completely as possible.

Depending on the composition of the crude phosphate, the processing operation and matter recycled from a subsequent purification treatment (scrubbing water), more or less strongly contaminated crude phosphoric acids and acid-insoluble compounds, which are separated during the filtration together with the calcium sulfate, are obtained.

Especially the fluorine contained in whatever crude phosphate together with more or less important quantities of aluminum undergoes reaction with silicon also present in the ore, to give $SiF_6^{2-}$ which is known to form difficulty soluble hexafluorosilicates with alkali metals and alkaline earth metals. To avoid this, i.e. in order to additionally reduce the fluorine content, the crude phosphoric acid already filtered off is admixed with a compound containing sodium and/or silicon so as to precipitate further sodium hexafluorosilicate (cf. German Specification DE-PS No. 16 67 435).

The solubility of $Na_2SiF_6$ greatly depends on the $P_2O_5$-concentration and temperature which have been found to vary between 0–30% and about 20°–70° C., respectively, especially during the scrubbing treatment calcium sulfate is subjected to; as a result, the solubility product of $Na_2SiF_6$ is excessively high or low at various places in the scrubbing stage.

This entails considerable problems in practice as the compound crystallizes out and undergoes growth preferentially at surfacial areas. Encrustations are liable to form practically at all surfaces which come into contact with the product, i.e. the reactor inside, filter, conduits or pumps or metering means or filter cloths, subtantially regardless of the material used for making these structural parts.

As a result, operational disturbances effecting operation or effecting production stoppages are encountered after relatively short operation periods. Needless to say, the production stoppages and necessary cleaning operations are rather expensive.

We have now found that the extent of such encrustation phenomena, i.e. the quantity of (precipitated) $Na_2SiF_6$ formed per unit time depends primarily on the type of crude phosphate used, under otherwise identical conditions. Whereas the use of Kola crude phosphate, for example, gives rise to some minor encrustation only, the fact remains that phosphates other than Kola phosphate strongly cake together especially in the filtration stage already after relatively short operational cycles, so that it is invariably necessary for the production to be stopped and for the production facilities to be cleaned.

We have also found that $Na_2SiF_6$ is distinctly better soluble in phosphoric acid based on Kola phosphate than in phosphoric acid prepared in analogous manner, however from South African Phalaborwa phosphate, the solubility depending on the $P_2O_5$-concentration (cf. FIG. 1 of the accompanying diagrams). The minor solubility in the latter acid apparently is the reason why differently strong encrustation problems are encountered during the production of the acids.

It is therefore an object of this invention to provide a process, useful in connection with making wet-process phosphoric acid which permits the aforementioned phenomena of $Na_2SiF_6$-precipitation and encrustation to be at least considerably reduced or obviated.

As has unexpectedly been found this is easy to achieve by the present invention which provides for wet-process acid to be made while adding, either to the phosphate ore or processed suspension, a quantity of an aluminum compound soluble in phosphoric acid sufficient for the processed suspension to present an aluminum concentration of 0.3–1.0 wgt %, preferably 0.5–0.7 wgt %.

It is more particularly possible for the aluminum compound to be added either to the phosphate ore and for the mixture to be then processed, or during processing at a place close to the feed point selected for adding the phosphate ore. The useful aluminum compounds should preferably be selected from aluminum hydroxides, sulfates, clay or aluminates, which may all be used in solid or dissolved form or in the form of a suspension.

The steps taken in accordance with this invention permit the encrustation of $Na_2SiF_6$ in acids presenting a low Al/F-molar ratio to be practically avoided or at least minimized to an extent such that disturbances during operation over customary operational periods are substantially not liable to occur.

BRIEF DESCRIPTION OF THE DRAWINGS

As can be inferred from a comparison of FIG. 1 with FIG. 2 of the accompanying diagrams it is possible by the addition of aluminum to phosphate ore containing relatively little Al (Phalaborwa-phosphate) to produce acids in which $Na_2SiF_6$ is approximately equally well soluble as in acids made from Kola phosphate of relatively high Al-content which are easy to process.

The following Examples illustrate the invention which is naturally not limited thereto.

EXAMPLE 1 (COMPARATIVE EXAMPLE)

Figure 1:
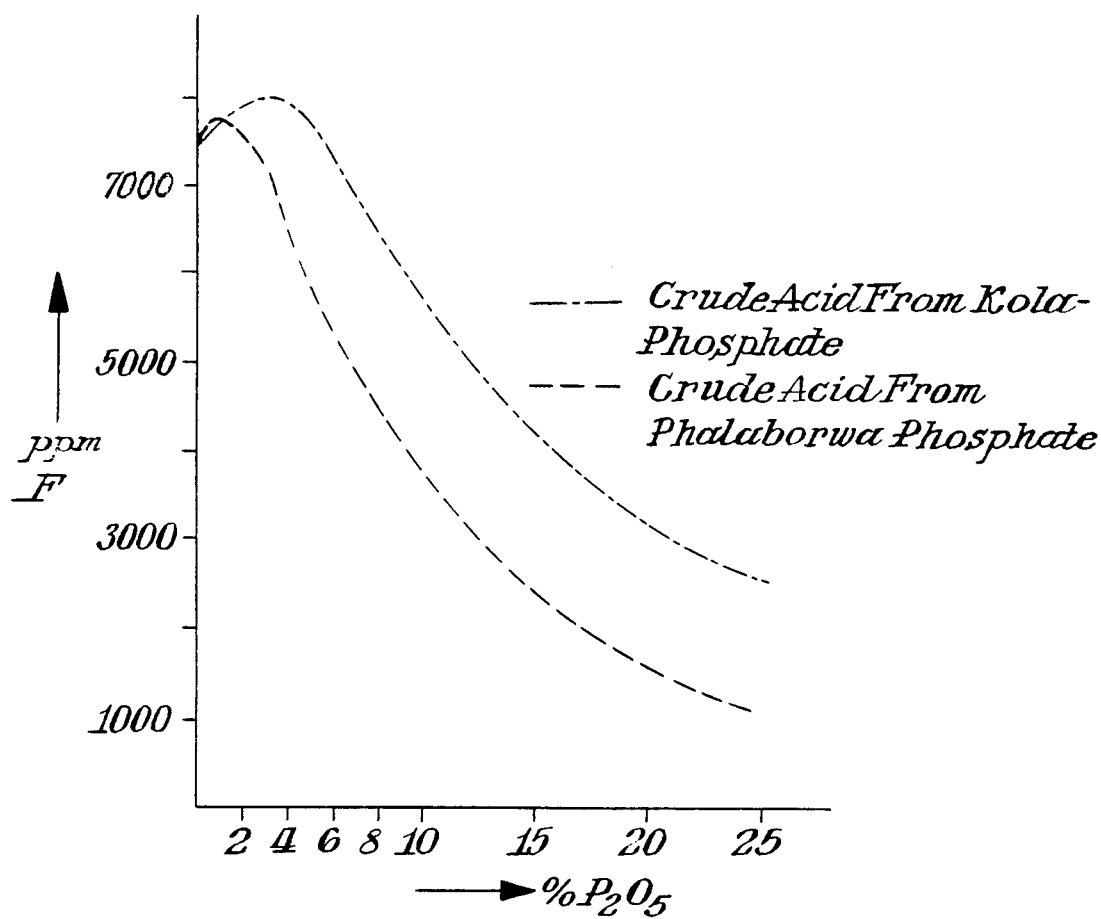
Figure 2:
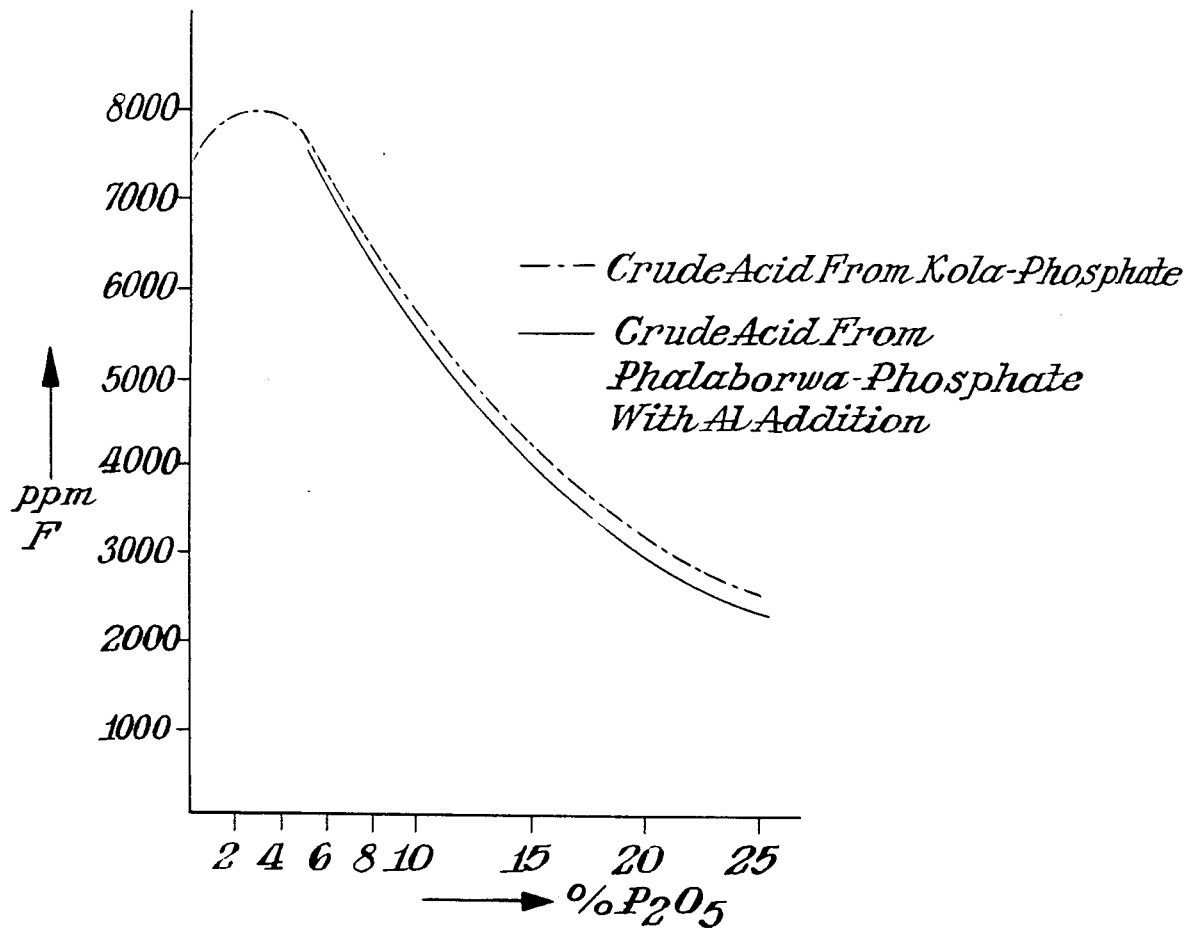

20 t/h Kola crude phosphate was processed with 71 t/h recycle acid and 18.5 t/h concentrated sulfuric acid at about 72° C. in a single tank. After a sojourn time of about 6 hours, the crude phosphoric acid was filtered off into a tilting pan filter. The processed suspension was found to contain 0.96 wgt % Al, based on $P_2O_5$.

The operating cycle was not disturbed. $Na_2Si_6$-encrustation was only found to have occured in the filtrate outlets provided in the scrubbing zone; in the outlet for scrubbed filtrate with 25% $P_2O_5$, for example, it was about 4.5 mm thick, after 30 days.

EXAMPLE 2 (COMPARATIVE EXAMPLE)

20 t/h South African Phalaborwa-phosphate (Palfos 86) was processed to give crude phosphoric acid, in the manner described in Example 1. A suspension containing 0.17 wgt % Al, based on $P_2O_5$ was obtained. Practically all lines or conduits but also the filter cloth were found to have been considerably encrusted with $Na_2SiF_6$ already after two days of operation; the encrustations affected the filtration output considerably and in the end made it necessary for the production to be stopped. As compared with Example 1, the $Na_2SiF_6$-encrustation was already 8 mm thick after 3 days, in the outlet for the 25% scrubbed filtrate, which had been completely cleaned prior to starting operation.

EXAMPLE 3

20 t/h Palfos-phosphate was processed as described in Example 2 save that 138.0 kg moist $Al(OH)_3$ (about 42.0 kg/h Al) was simultaneously introduced into the reactor so that a processed suspension containing 0.32 wgt % Al, based on $P_2O_5$, was obtained. The $Na_2SiF_6$-encrustations were approximately as low, and the operation periods approximately as long as those indicated in Example 1.

EXAMPLE 4

Morocco Bu-craa-phosphate ore was processed without addition of Al, and a crude phsophoric acid containing 26 wgt % $P_2O_5$, 0.146 wgt % F and 0.076 wgt % Al was obtained.

A second crude acid was made under identical conditions however while adding a quantity of $Al(OH)_3$ to the processed suspension sufficient for it to contain 0.80 wgt % Al, based on $P_2O_5$; the second acid differed from the first in its higher Al-content of 0.32 wgt %.

Figure 3:
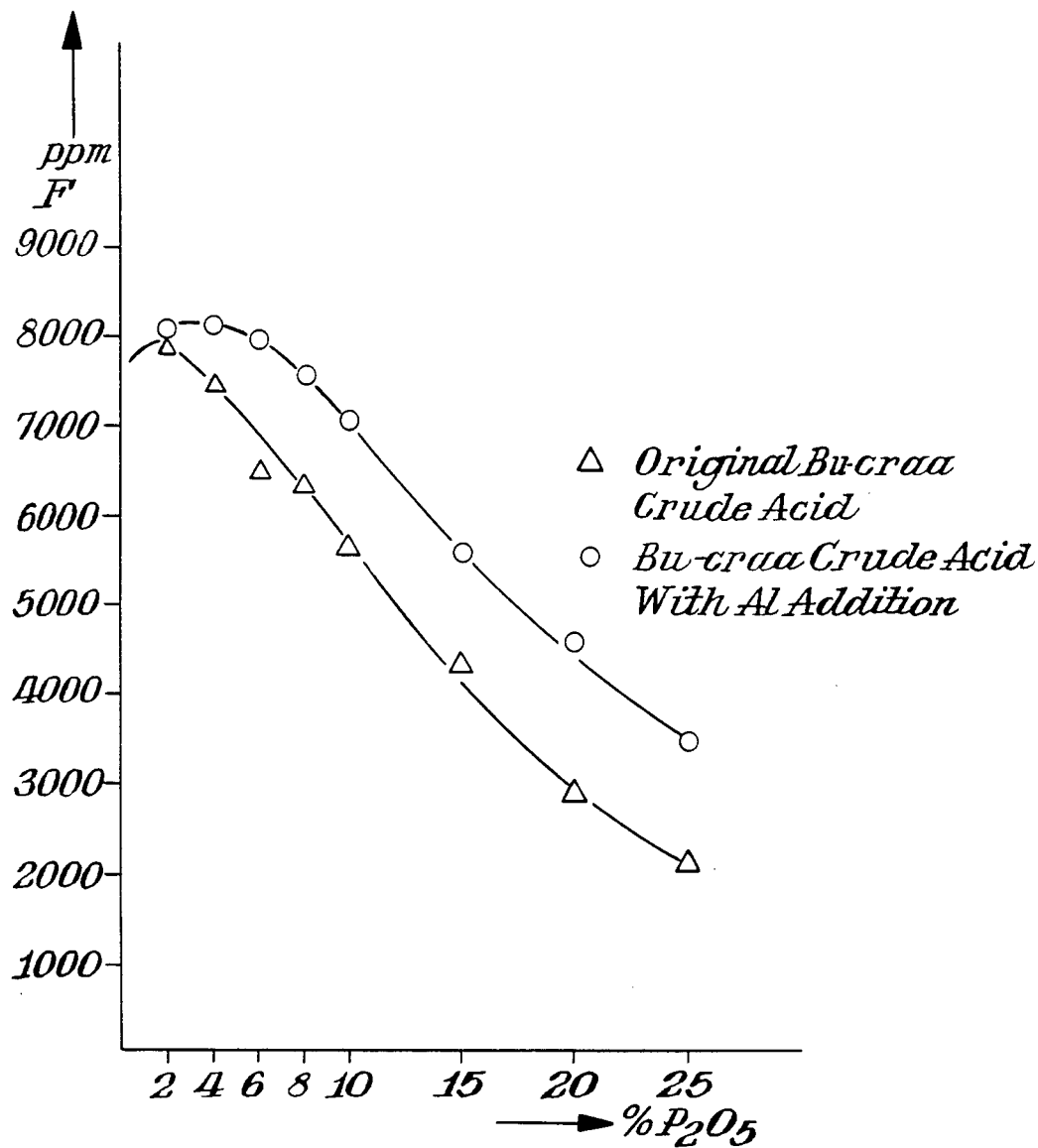

In various dilute acids made from such crude acid admixed with Al $Na_2SiF_6$ was found to be distinctly more soluble than in acids made from crude acid not admixed with Al (cf. FIG. 3 of the accompanying diagrams).

We claim:

1. Process for preventing precipitation of $Na_2SiF_6$ during mineral acid treatment of a fluorine-containing phosphate ore which is lower in aluminum content than Kola phosphate ore, the mineral acid treatment resulting in the formation of a suspension containing less than 0.3 weight-% aluminum based on the $P_2O_5$ content of the suspension, the liquid phase of said suspension containing sodium ions, crude phosphoric acid, and scrubbing water recycled from subsequent purification of the crude phosphoric acid, the solid phase of said suspension containing solid material formed and retained by said mineral acid treatment, said process comprising:

adding, either to the phosphate ore or to said suspension, a quantity of an aluminum compound selected from the group consisting of aluminum hydroxide, aluminum sulfate, clay, or aluminate sufficient to increase the aluminum concentration in said suspension to 0.3–1.0 weight-%, based on the $P_2O_5$ content thereof.

2. The process as claimed in claim 1, wherein the aluminum compound is added in a quantity sufficient for the processed suspension to present an aluminum concentration of 0.5 to 0.7 wgt %.

3. The process as claimed in claim 1, wherein the aluminum compound is mixed with the phosphate ore prior to processing the ore.

4. The process as claimed in claim 1, wherein the aluminum compound is added during processing at a place close to the feed point selected for adding the phosphate ore.

5. The process of claim 1 wherein said crude phosphoric acid is wet-process phoshoric acid.

* * * * *